United States Patent
Zhang et al.

(10) Patent No.: US 12,505,899 B2
(45) Date of Patent: Dec. 23, 2025

(54) POWER LOSS ERROR DETECTION USING PARTIAL BLOCK HANDLING

(71) Applicant: Micron Technology, Inc., Boise, ID (US)

(72) Inventors: Peng Zhang, Los Altos, CA (US); Lei Lin, Fremont, CA (US); Zhongguang Xu, San Jose, CA (US); Li-Te Chang, San Jose, CA (US); Zhengang Chen, San Jose, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 242 days.

(21) Appl. No.: 18/492,252

(22) Filed: Oct. 23, 2023

(65) Prior Publication Data

US 2024/0170090 A1    May 23, 2024

Related U.S. Application Data

(60) Provisional application No. 63/384,646, filed on Nov. 22, 2022.

(51) Int. Cl.
*G11C 16/10* (2006.01)
*G11C 16/26* (2006.01)
*G11C 29/52* (2006.01)

(52) U.S. Cl.
CPC ............ *G11C 29/52* (2013.01); *G11C 16/102* (2013.01); *G11C 16/26* (2013.01)

(58) Field of Classification Search
CPC ....... G11C 29/52; G11C 16/102; G11C 16/26; G11C 11/5642; G11C 29/028; G11C 16/0483; G11C 29/021; G11C 8/08; G11C 7/1051; G11C 7/12
See application file for complete search history.

(56) References Cited

U.S. PATENT DOCUMENTS

| 2016/0118143 A1* | 4/2016 | Muchherla | G11C 16/349 714/721 |
| 2019/0065108 A1* | 2/2019 | Miller | G11C 16/30 |

\* cited by examiner

*Primary Examiner* — Xiaochun L Chen
(74) *Attorney, Agent, or Firm* — Harrity & Harrity, LLP

(57) ABSTRACT

In some implementations, a memory device may determine that a power loss has occurred. The memory device may determine a last written page (LWP) location associated with an LWP of a block of a memory of the memory device. The memory device may determine one of: a word line group (WLG) associated with the LWP location and at least one WLG-dependent offset associated with the WLG, or a partial block (PB) fill ratio associated with the LWP location and at least one PB-fill-ratio-dependent offset associated with the PB fill ratio. The memory device may perform a power loss error detection procedure based on one of the at least one WLG-dependent offset or the at least one PB-fill-ratio offset by applying the one of the at least one WLG-dependent offset or the at least one PB-fill-ratio offset to at least one read reference voltage.

20 Claims, 10 Drawing Sheets

| PB fill percentage | Level 1 | Level 2 | Level 3 | Level 4 | Level 5 | Level 6 | Level 7 |
|---|---|---|---|---|---|---|---|
| [0%, 10%] | Ofst1-1 | Ofst1-2 | Ofst1-3 | Ofst1-4 | Ofst1-5 | Ofst1-6 | Ofst1-7 |
| [10%, 20%] | Ofst2-1 | Ofst2-2 | Ofst2-3 | Ofst2-4 | Ofst2-5 | Ofst2-6 | Ofst2-7 |
| [20%, 30%] | Ofst3-1 | Ofst3-2 | Ofst3-3 | Ofst3-4 | Ofst3-5 | Ofst3-6 | Ofst3-7 |
| [30%, 50%] | Ofst4-1 | Ofst4-2 | Ofst4-3 | Ofst4-4 | Ofst4-5 | Ofst4-6 | Ofst4-7 |
| [50%, 100%] | Ofst5-1 | Ofst5-2 | Ofst5-3 | Ofst5-4 | Ofst5-5 | Ofst5-6 | Ofst5-7 |

POWER LOSS ERROR DETECTION USING PARTIAL BLOCK HANDLING

CROSS REFERENCE TO RELATED APPLICATION

This patent application claims priority to U.S. Provisional Patent Application No. 63/384,646, filed on Nov. 22, 2022, and entitled "POWER LOSS ERROR DETECTION USING PARTIAL BLOCK HANDLING." The disclosure of the prior application is considered part of and is incorporated by reference into this patent application.

TECHNICAL FIELD

The present disclosure generally relates to memory devices, memory device operations, and, for example, to power loss error detection using partial block handling.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
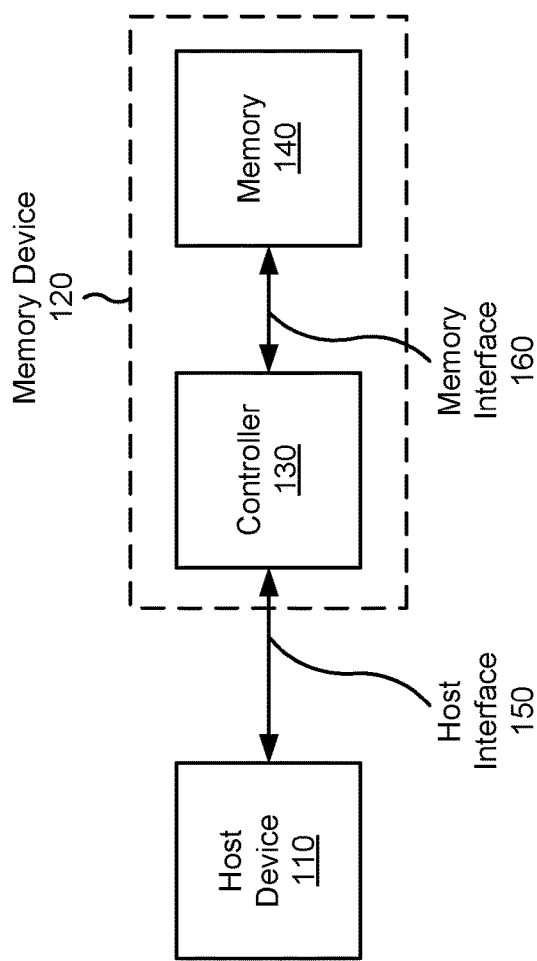
FIG. 1 is a diagram illustrating an example system capable of performing power loss error detection using partial block (PB) handling.

Memory devices may be programmed using a write operation, sometimes referred to as a programming operation. During a write operation, memory cells may be charged to certain data states that represent binary values. For example, in memory devices including single-level cells (SLCs), each cell may be charged to a data state representing one of binary "1" or binary "0." In memory devices including multi-level cells (MLCs), triple-level cells (TLCs), quad-level cells (QLCs), or beyond, each cell may be charged to a data state representing multiple bits. More particularly, an MLC may be charged to a state representing two binary bits per memory cell, a TLC may be charged to a state representing three binary bits per memory cell, and a QLC may be charged to a state representing four binary bits per memory cell. In some examples, "MLC" may be used to generically refer to a memory cell that stores two or more bits of data. For MLCs, TLCs, QLCs, and other multi-bit memory cells, each bit may be referred to as a type of page data. For example, in MLCs, the first and second bits may be referred to as the cell's "upper page data" and "lower page data," respectively. For TLCs, the first, second, and third bits may be referred to as the cell's "extra page data," "upper page data," and "lower page data," respectively. And for QLCs, the first, second, third, and fourth bits may be referred to as the cell's "top page data," "extra page data," "upper page data," and "lower page data," respectively. Each memory cell may be coupled to other memory cells via a corresponding word line (WL) and a corresponding bit line (BL).

During a write operation, memory cells may be written at a page level, which may be a group of memory cells connected to the same WL and/or access line. The memory device may apply a programming voltage to a selected WL and thus to memory cells coupled to the selected WL. For a memory cell targeted for programming during a particular voltage pulse, a ground potential may be applied to the corresponding BL connected to the memory cell, resulting in charge transfer to the targeted memory cell. For a memory cell not targeted for programming during a particular voltage pulse, a pass voltage and/or an inhibit voltage may be applied to a corresponding BL connected to the memory cell, thereby inhibiting charge from being transferred to the non-targeted memory cell. Multiple voltage pulses may be applied to the WL, during which a ground potential may be applied to each memory cell (more particularly, to a BL connected to each memory cell) that has not yet reached a targeted data state, while a pass and/or inhibit voltage may be applied to each memory cell that has reached a targeted data state. The voltage pulses may continue in this manner until the page is fully programmed (e.g., until each memory cell has reached its targeted voltage or data state). In this way, memory cells being programmed to data states associated with a lowest threshold voltage may reach a target voltage level first during the write operation, while memory cells being programmed to data states associated with a highest threshold voltage may reach a target voltage level last during the write operation. For example, in TLC memory devices, in which each cell is capable of storing data in one of eight data states, corresponding to threshold voltages that are sometimes referred to as Level 0 through Level 7, memory cells that are being programmed to Level 7 may be cells for which a threshold voltage is reached last during a write operation.

In some cases, a memory device may lose power during a write operation. In such cases, a write operation may not have been completed, resulting in bit errors on a page. Accordingly, following a power loss, a memory device may perform a power loss error detection procedure (sometimes referred to as a NAND detect program completion (NDPC) procedure) to determine if a last written page (LWP) was finished programming prior to the power loss and/or to determine whether the LWP has a high enough reliability margin to be kept. Put another way, when a memory device is powered back on following a power loss, the memory device may trigger the power loss error detection procedure to determine if the power loss resulted in bit errors on the LWP. In examples in which the power loss error detection procedure reveals that the LWP was finished programming and/or has a high enough reliability margin to be kept, the memory device may maintain the data. However, in examples in which the power loss error detection procedure reveals that the LWP was not finished programming and/or has too low of a reliability margin to be kept, the memory device may discard the data by marking the page as invalid and/or marking the page for erasure.

In some examples, pass-fail criteria associated with a power loss error detection procedure (e.g., an NDPC procedure) may be based on a fail bit count (FBC) associated with an extra page (XP) read operation performed during the power loss error detection procedure. In such examples, the memory device may perform the XP read operation on the LWP and determine the FBC, which may correspond to a number of bits that do not align with an expected threshold voltage during the XP read procedure. If the FBC is greater than a threshold, indicating that the LWP was not fully programmed and/or indicating that the LWP is not associated with a high enough reliability margin to be kept, the LWP is marked as invalid and/or marked for erasure during a garbage collection procedure or similar procedure, and thus the data associated with the LWP will be relocated to a new page (e.g., the data will be rewritten to a new page). However, if the FBC is less than the threshold, indicating that the LWP was fully programmed and/or indicating that the LWP is associated with a high enough reliability margin to be kept, the page is maintained and thus the data associated with the LWP does not need to be relocated to a new page.

For the power loss error detection procedure, a programming state of memory cells associated with a highest threshold voltage (e.g., memory cells associated with Level 7 threshold voltage in a TLC cell) may form the key judgment as to whether a programming operation was completed and/or whether an LWP is associated with a high enough reliability margin to be maintained, because cells associated with a highest threshold voltage may be the final cells to be fully programmed on a page. However, in some examples, memory cells associated with other voltage levels may contribute to the FBC associated with the XP read operation, which may skew an FBC count and thus result in a high overkill rate (e.g., a determination that a page has failed the power loss error detection procedure even if the page is associated with a finished programming operation and/or has a high enough reliability margin to be maintained). For example, in some cases, an XP read operation may be associated with two read reference voltages: a Level 3 read reference voltage (e.g., a read reference voltage near a Level 3 threshold voltage, sometimes referred to as a Level 3 read trim and/or "Rd_lv3") as well as a Level 7 read reference voltage (e.g., a read reference voltage near a Level 7 threshold voltage, sometimes referred to as a Level 7 read trim and/or "Rd_lv7"). Accordingly, an FBC associated with the XP read operation may have contributions from both Level 3 reads (e.g., read operations performed using a Rd_lv3 voltage) and Level 7 reads (e.g., read operations performed using a Rd_lv7 voltage).

In such cases, the Level 3 threshold voltages in a TLC memory device may downshift from an originally programmed voltage level due to reasons other than power loss induced write errors, thereby increasing the FBC. For example, the Level 3 threshold voltages in a TLC memory device may downshift due to a back-pattern effect, which may be a shift in threshold voltage levels for all WLs in a partial block (PB). In such cases, memory cells associated with lower-indexed WLs and/or lower PB fill percentages may experience a greater threshold voltage shift than memory cells associated with higher indexed WLs and/or higher PB fill percentages. Additionally, or alternatively, the Level 3 threshold voltages in a TLC memory device may downshift due to cell-to-cell coupling, which may be a shift in threshold voltage levels for boundary WLs (e.g., an LWP) in a PB. In such cases, boundary WLs associated with lower WL indexes and/or lower PB fill percentages may experience a greater threshold voltage shift than boundary WLs associated with higher indexed WLs and/or higher PB fill percentages.

Notwithstanding these phenomena (e.g., a back-pattern effect, cell-to-cell coupling, or a similar phenomenon associated with PB writing), the power loss error detection procedure may rely on default read trims (e.g., may use default read reference voltage levels associated with originally programmed threshold voltages), resulting in a high FBC. For example, in examples in which the power loss error detection procedure is based on an FBC of XP read operations, a shift in threshold voltages in a PB near a Level 3 read reference voltage due to a back-pattern effect, cell-to-cell coupling, or a similar phenomenon may result in a high FBC when using default read trims (and thus a failure of the power loss error detection check), even when the LWP was finished programming or otherwise is associated with a high enough reliability margin to be maintained. Accordingly, the error loss detection procedure may result in a high overkill rate, in which certain pages that had finished programming or that are otherwise associated with a high enough reliability margin to be kept are nonetheless marked for erasure, requiring that the data be relocated to new pages. This may result in unnecessary power, computing, and memory resource consumption, because otherwise reliable pages are being discarded and reprogrammed.

Some implementations described herein enable a power loss error detection procedure that compensates for PB-induced voltage shift phenomena, thereby reducing an overkill rate associated with the power loss error detection procedure and thus conserving power, computing, and memory resources that would otherwise be used to handle incorrectly identified power-loss-induced errors. In some implementations, a memory device may track an LWP location within a block, and may utilize one or more read reference voltage offsets based at least in part on the LWP location. For example, in some implementations, a higher offset may be utilized when the LWP location is associated with a relatively low WL index (and thus the LWP is associated with a relatively low PB fill ratio), because PB-induced threshold voltage shifts may be more pronounced for lower PB fill ratios. Similarly, a higher offset may be utilized when the LWP location is associated with a relatively high WL index (and thus the LWP is associated with a relatively high PB fill ratio), because PB-induced threshold voltage shifts may be less pronounced for higher PB fill ratios. As a result, the power loss error detection procedure may more accurately determine if an LWP was finished programming at the time of power loss and/or if the LWP is associated with a high enough reliability margin to be maintained, thereby reducing the power loss error detection procedure overkill rate and thus reducing power, computing, and memory resource consumption that would otherwise be used to reprogram data and perform garbage collection for unnecessarily discarded pages. These and other features will be described in more detail below in connection with the accompanying figures.

FIG. 1 is a diagram illustrating an example system 100 capable of performing power loss error detection using PB handling. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to determine that a power loss has occurred; determine an LWP location associated with an LWP of a block of a memory of the memory device; determine one of: a word line group (WLG) associated with the LWP location and at least one WLG-dependent offset associated with the WLG, or a PB fill ratio associated with the LWP location and at least one PB-fill-ratio-dependent offset associated with the PB fill ratio; and perform a power loss error detection procedure based on one of the at least one WLG-dependent offset or the at least one PB-fill-ratio-dependent offset by applying the one of the at least one WLG-dependent offset or the at least one PB-fill-ratio offset to at least one read reference voltage associated with the power loss error detection procedure.

As indicated above, FIG. 1 is provided as an example. Other examples may differ from what is described with regard to FIG. 1.

Figure 2:
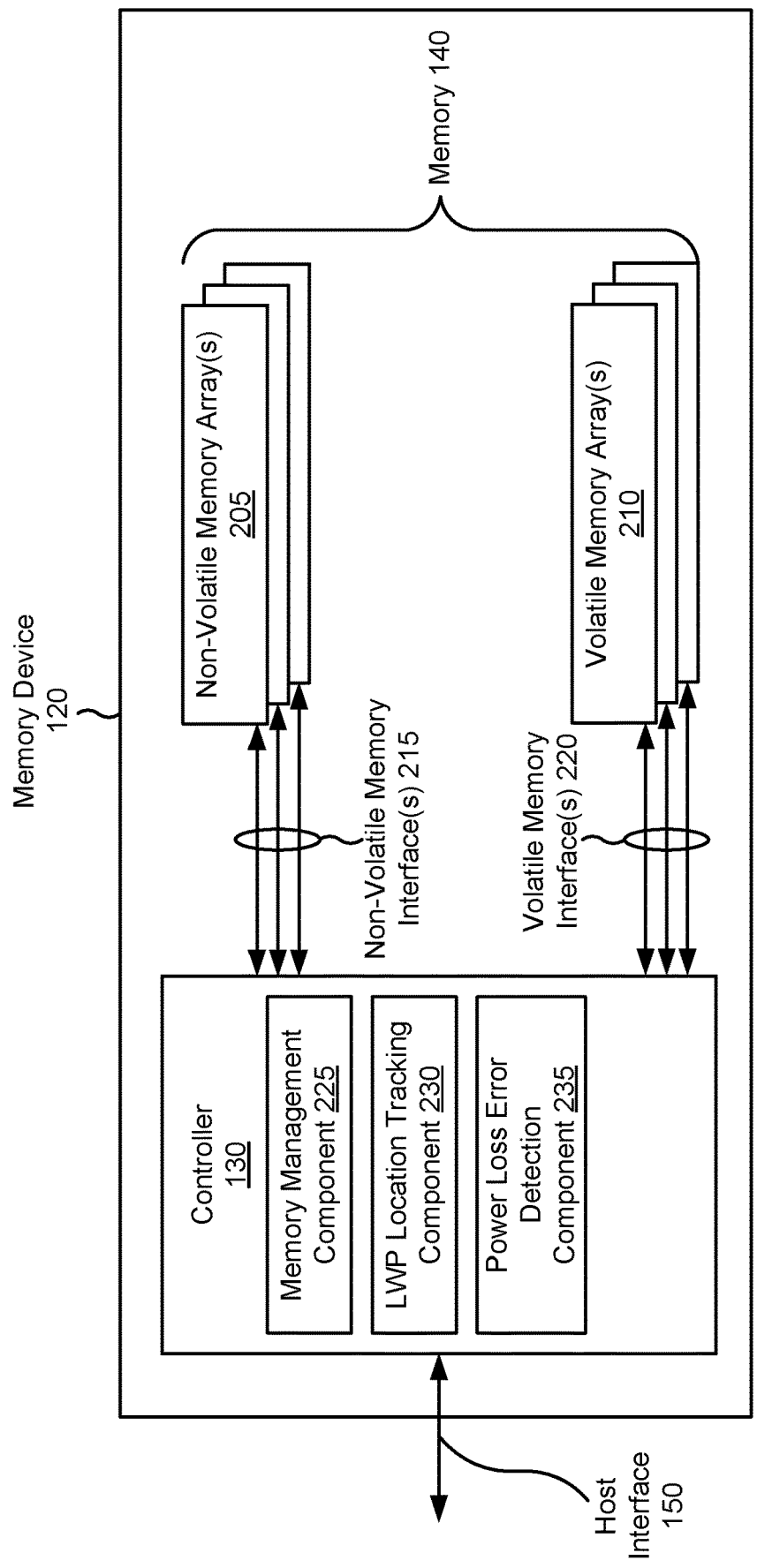
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an LWP location tracking component 230, and/or a power loss error detection component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The LWP location tracking component 230 may be configured to track a location of an LWP, such as for purposes of performing a power loss error detection procedure using PB handling. For example, the LWP location tracking component 230 may determine a WL associated with an LWP. In some implementations, a block may be associated with multiple WL groups (WLGs), with each WLG associated with a subset of the total WLs forming the block. In such implementations, the LWP location tracking component 230 may be configured to determine a WLG associated with a WL of the LWP. Additionally, or alternatively, the LWP location tracking component 230 may determine a PB fill ratio associated with the LWP. For example, the LWP location tracking component 230 may be configured to determine a PB fill ratio associated with the LWP by comparing an index of a WL associated with the LWP (sometimes referred to as $WL_{LWP}$) to an index of a final WL or maximum WL associated with the block (sometimes referred to as $WL_{max}$). More particularly, in some implementations, the LWP location tracking component 230 may be configured to calculate the PB fill ratio, which may be equal to $WL_{LWP}/WL_{max}$.

The power loss error detection component 235 may be configured to perform an error detection procedure following a power loss or a similar interruption of memory device 120 operations. In some implementations, the power loss error detection component 235 may be configured to trigger the power loss error detection procedure upon powering up the memory device 120 following a power loss. Additionally, or alternatively, in some implementations, the power loss error detection component 235 may be configured to perform a power loss error detection procedure based on a location of an LWP in the block. For example, the power loss error detection component 235 may be configured to use one or more offsets when performing the power loss error detection procedure, with the one or more offsets being LWP-location dependent. More particularly, and as described in more detail herein, the one or more offsets may be WLG-dependent offsets and/or PB-fill-ratio-dependent offsets.

One or more devices or components shown in FIG. 2 may be configured to perform operations described elsewhere herein, such as one or more operations and/or methods described in connection with FIGS. 3-9. For example, the controller 130, the memory management component 225, the LWP location tracking component 230, and/or the power loss error detection component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
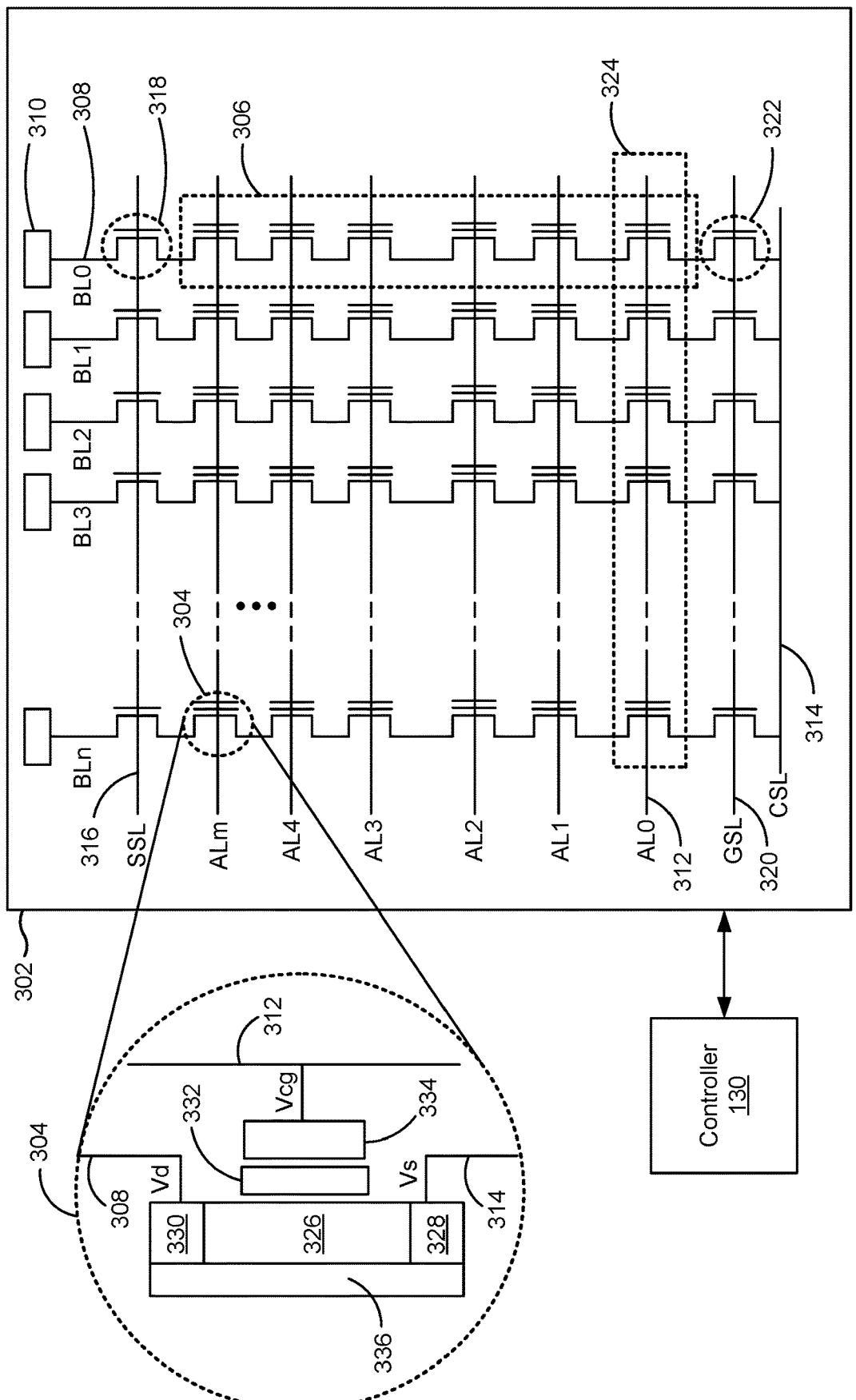
FIG. 3 is a diagram of example components included in a memory device.

FIG. 3 is a diagram of example components included in a memory device 120. As described above in connection with FIG. 1, the memory device 120 may include a controller 130 and memory 140. As shown in FIG. 3, the memory 140 may include a memory array 302, which may correspond to a non-volatile memory array 210 described above in connection with FIG. 2.

In FIG. 3, the memory array 302 is a NAND memory array. However, in some implementations, the memory array 302 may be another type of memory array, such as a NOR memory array, a resistive RAM (RRAM) memory array, a magnetoresistive RAM (MRAM) memory array, a ferroelectric RAM (FeRAM) memory array, a spin-transfer torque RAM (STT-RAM) memory array, or the like. In some implementations, the memory array 302 is part of a three-dimensional stack of memory arrays, such as 3D NAND flash memory, 3D NOR flash memory, or the like.

The memory array 302 includes multiple memory cells 304. A memory cell 304 may store an analog value, such as an electrical voltage or an electrical charge, that represents a data state (e.g., a digital value). The analog value and corresponding data state depend on a quantity of electrons trapped or present within a region of the memory cell 304 (e.g., in a charge trap), as described below.

A NAND string 306 (sometimes called a string) may include multiple memory cells 304 connected in series. A NAND string 306 is coupled to a bit line 308 (sometimes called a digit line or a column line, and shown as BL0-BLn). Data can be read from or written to the memory cells 304 of a NAND string 306 via a corresponding bit line 308 using one or more input/output (I/O) components 310 (e.g., an I/O circuit, an I/O bus, a page buffer, and/or a sensing component, such as a sense amplifier). Memory cells 304 of different NAND strings 306 (e.g., one memory cell 304 per NAND string 306) may be coupled with one another via access lines 312 (sometimes called WLs or row lines, and shown as AL0-ALm) that select which row (or rows) of memory cells 304 is affected by a memory operation (e.g., a read operation or a write operation).

A NAND string 306 may be connected to a bit line 308 at one end and a common source line (CSL) 314 at the other end. A string select line (SSL) 316 may be used to control respective string select transistors 318. A string select transistor 318 selectively couples a NAND string 306 to a corresponding bit line 308. A ground select line (GSL) 320 may be used to control respective ground select transistors 322. A ground select transistor 322 selectively couples a NAND string 306 to the common source line 314.

A "page" of memory (or "a memory page") may refer to a group of memory cells 304 connected to the same access line 312, as shown by reference number 324. In some implementations (e.g., for SLCs), the memory cells 304 connected to an access line 312 may be associated with a single page of memory. In some implementations (e.g., for MLCs), the memory cells 304 connected to an access line 312 may be associated with multiple pages of memory, where each page represents one bit stored in each of the memory cells 304 (e.g., a lower page that represents a first bit stored in each memory cell 304 and an upper page that represents a second bit stored in each memory cell 304). In NAND memory, a page is the smallest physically addressable data unit for a write operation (sometimes called a program operation).

In some implementations, a memory cell 304 is a floating-gate transistor memory cell. In this case, the memory cell 304 may include a channel 326, a source region 328, a drain region 330, a floating gate 332, and a control gate 334. The source region 328, the drain region 330, and the channel 326 may be on a substrate 336 (e.g., a semiconductor substrate). The memory device 120 may store a data state in the memory cell 304 by charging the floating gate 332 to a particular voltage associated with the data state and/or to a voltage that is within a range of voltages associated with the data state. This results in a predefined amount of current flowing through the channel 326 (e.g., from the source region 328 to the drain region 330) when a specified read reference voltage is applied to the control gate 334 (e.g., by a corresponding access line 312 connected to the control gate 334). Although not shown, a tunnel oxide layer (or tunnel dielectric layer) may be interposed between the floating gate 332 and the channel 326, and a gate oxide layer (e.g., a gate dielectric layer) may be interposed between the floating gate 332 and the control gate 334. As shown, a drain voltage Vd may be supplied from a bit line 308, a control gate voltage Veg may be supplied from an access line 312, and a source voltage Vs may be supplied via the common source line 314 (which, in some implementations, is a ground voltage).

To write or program the memory cell 304, Fowler-Nordheim tunneling may be used. For example, a strong positive voltage potential may be created between the control gate 334 and the channel 326 (e.g., by applying a large positive voltage to the control gate 334 via a corresponding access line 312) while current is flowing through the channel 326 (e.g., from the common source line 314 to the bit line 308, or vice versa). The strong positive voltage at the control gate 334 causes electrons within the channel 326 to tunnel through the tunnel oxide layer and be trapped in the floating gate 332. These negatively charged electrons then act as an electron barrier between the control gate 334 and the channel 326 that increases the threshold voltage of the memory cell 304. The threshold voltage is a voltage required at the control gate 334 to cause current (e.g., a threshold amount of current) to flow through the channel 326. Fowler-Nordheim tunneling is an example technique for storing a charge in the floating gate, and other techniques, such as channel hot electron injection, may be used.

In some other examples, a memory device may include a charge trap transistor configured to store electrical charge. In a charge trap type memory device, data is programmed or erased by providing or removing charges in or from a charge trap layer (e.g., a silicon-nitride (SiN) storage layer) through tunneling or injecting of electrons into the charge trap layer in a memory cell. The charge trap layer may be a dielectric material that can trap charges, thereby permitting the storage layer to be shared and continuous among the memory cells. Because in some implementations a WL is formed in the memory device by replacing one or more SiN films originally stacked in the memory device during a manufacturing process, charge trap memory devices are sometimes referred to as replacement gate (RG) memory devices.

To read the memory cell 304, a read reference voltage may be applied to the control gate 334 (e.g., via a corresponding access line 312), and an I/O component 310 (e.g., a sense amplifier) may determine the data state of the memory cell 304 based on whether current passes through the memory cell 304 (e.g., the channel 326) due to the applied voltage. A pass voltage may be applied to all memory cells 304 (other than the memory cell 304 being read) in the same NAND string 306 as the memory cell 304 being read. For example, the pass voltage may be applied on each access line 312 other than the access line 312 of the memory cell 304 being read (e.g., where the read reference voltage is applied). The pass voltage is higher than the highest read reference voltage associated with any memory cell data states so that all of the other memory cells 304 in the NAND string 306 conduct, and the I/O component 310 can detect a data state of the memory cell 304 being read by sensing current (or lack thereof) on a corresponding bit line 308. For example, in a single-level memory cell that stores one of two data states, the data state is a "1" if current is detected, and the data state is a "0" if current is not detected. In a multi-level memory cell that stores one of three or more data states, multiple read reference voltages are applied, over time, to the control gate 334 to distinguish between the three or more data states and determine a data state of the memory cell 304.

To erase the memory cell 304, a strong negative voltage potential may be created between the control gate 334 and the channel 326 (e.g., by applying a large negative voltage to the control gate 334 via a corresponding access line 312). The strong negative voltage at the control gate 334 causes trapped electrons in the floating gate 332 to tunnel back across the oxide layer from the floating gate 332 to the channel 326 and to flow between the common source line 314 and the bit line 308. This removes the electron barrier between the control gate 334 and the channel 326 and decreases the threshold voltage of the memory cell 304 (e.g., to an empty or erased state, which may represent a "1"). In NAND memory, a block is the smallest unit of memory that can be erased. A block of NAND memory includes multiple pages. Thus, an individual page of a block cannot be erased without erasing every other page of the block. In some implementations, a block may be divided into multiple sub-blocks. A sub-block is a portion of a block and may include a subset of pages of the block and/or a subset of memory cells of the block.

As indicated above, FIG. 3 is provided as an example. Other examples may differ from what is described with regard to FIG. 3.

Figure 4:
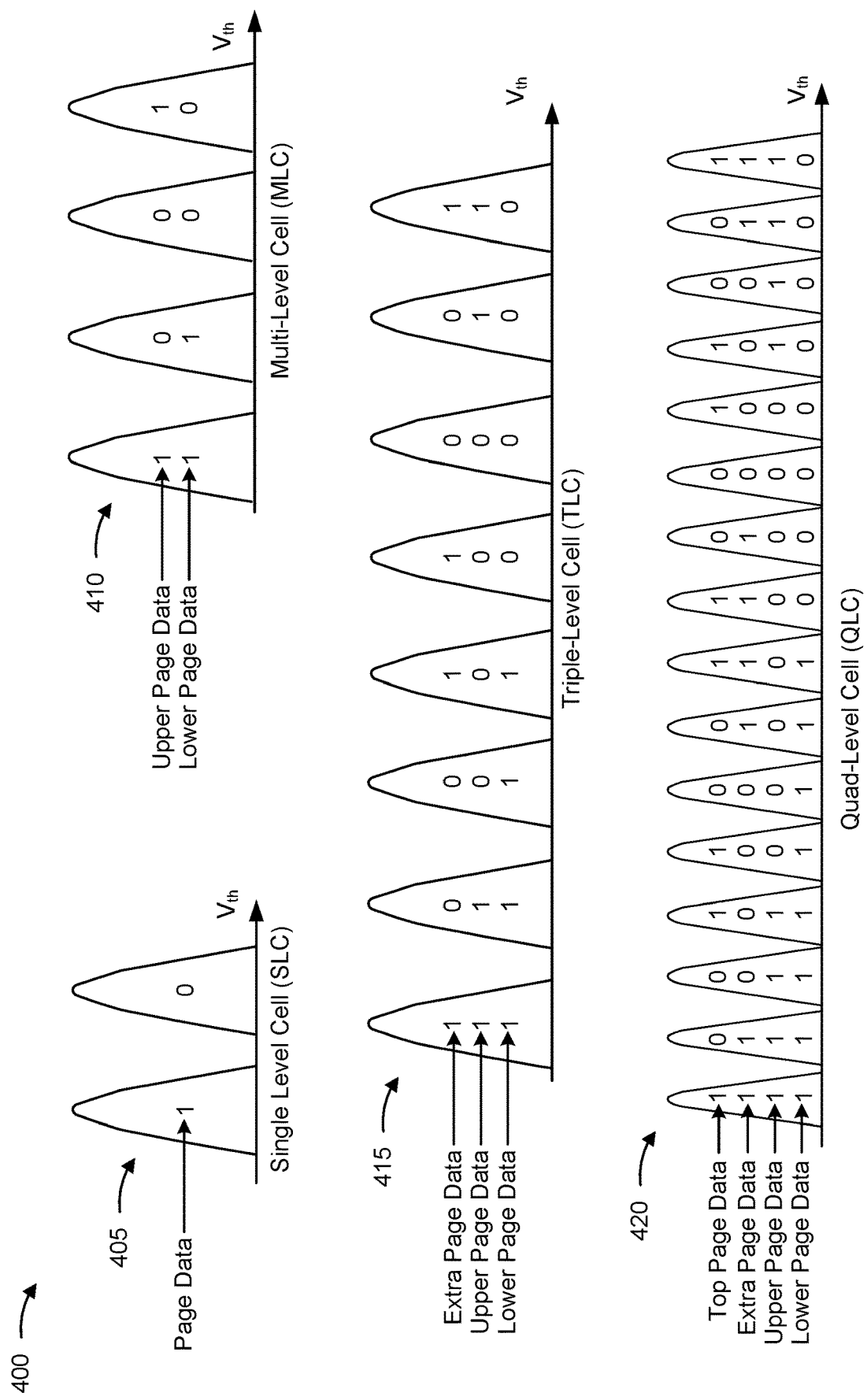
FIG. 4 is a diagram illustrating an example of single-level cell, multi-level cell (MLC), triple-level cell, and quad-level cell non-volatile memory.

FIG. 4 is a diagram illustrating an example 400 of SLC, MLC. TLC, and QLC non-volatile memory. One or more of these memory types may be used by a memory device described herein.

In some cases, a non-volatile memory device, such as a NAND device, may store bits of data by charging or not charging memory cells, which may be capable of retaining a charge (e.g., electrons) even when no voltage is applied to the cell, as described above in connection with FIG. 3. More particularly, a non-volatile memory cell, such as a NAND cell, may be categorized as an SLC, an MLC, a TLC, or a QLC, among other examples. As shown by reference number 405, an SLC stores a single binary bit per memory cell, and thus may store either binary 1 or binary 0. In an SLC, the stored bit is sometimes referred to as the page data of the memory cell. When writing to an SLC, the cell may be charged to a threshold voltage (Vth) falling within the distribution of the curve labeled with page data "1" when the memory cell is to store binary 1 (or else may include no charge when the memory cell is to store binary 1), and may be charged to a threshold voltage falling within the distribution of the curve labeled with page data "0" when the memory cell is to store binary 0.

Unlike an SLC, which only stores a single bit, an MLC, a TLC, and a QLC may store multiple bits per memory cell. More particularly, as shown by reference number 410, an MLC stores two binary bits per memory cell, and thus is capable of storing binary 11, binary 01, binary 00, or binary 10 according to a level of a charged stored in the MLC. In an MLC, a first stored bit is sometimes referred to as the cell's upper page data, and the second stored bit is sometimes referred to as the cell's lower page data. When writing to an MLC, the cell may be charged to a threshold voltage falling within the distribution of the curve labeled with page data "11" when the memory cell is to store binary 11 (or else may include no charge when the memory cell is to store binary 11), the cell may be charged to a threshold voltage falling within the distribution of the curve labeled with page data "01" when the memory cell is to store binary 01, the cell may be charged to a threshold voltage falling within the distribution of the curve labeled with page data "00" when the memory cell is to store binary 00, and the cell may be charged to a threshold voltage falling within the distribution of the curve labeled with page data "10" when the memory cell is to store binary 10. In some implementations, an MLC stores binary 11 when the MLC's charge is approximately 25% full, the MLC stores binary 01 when the MLC's charge is approximately 50% full, the MLC stores binary 00 when the MLC's charge is approximately 75%, and the MLC stores binary 10 when the MLC's charge is approximately 100% full.

In a similar manner, and as shown by reference number 415, a TLC stores three binary bits per memory cell, and thus a TLC is capable of storing binary 111, binary 011, binary 001, binary 101, binary 100, binary 000, binary 010, or binary 110. For a TLC, the first, second, and third stored bits are sometimes referred to as the cell's "extra page data," the cell's "upper page data," and the cell's "lower page data," respectively. Moreover, as shown by reference number 420, a QLC stores four binary bits per memory cell, and thus is capable of storing binary 1111, binary 0111, binary 0011, binary 1011, binary 1001, binary 0001, binary 0101, binary 1101, binary 1100, binary 0100, binary 0000, binary 1000, binary 1010, binary 0010, binary 0110, or binary 1110. For a QLC, the first, second, third, and fourth bits are sometimes referred to as the cell's "top page data," the cell's "extra page data," the cell's "upper page data," and the cell's "lower page data," respectively. More broadly, for an n-bit memory cell, the threshold voltage of the cell may be programmed to $2^n$ separate states, with each state corresponding to a non-overlapping threshold distribution, as shown for the various memory cells in FIG. 4.

As indicated above, FIG. 4 is provided as an example. Other examples may differ from what is described with regard to FIG. 4.

Figure 5:
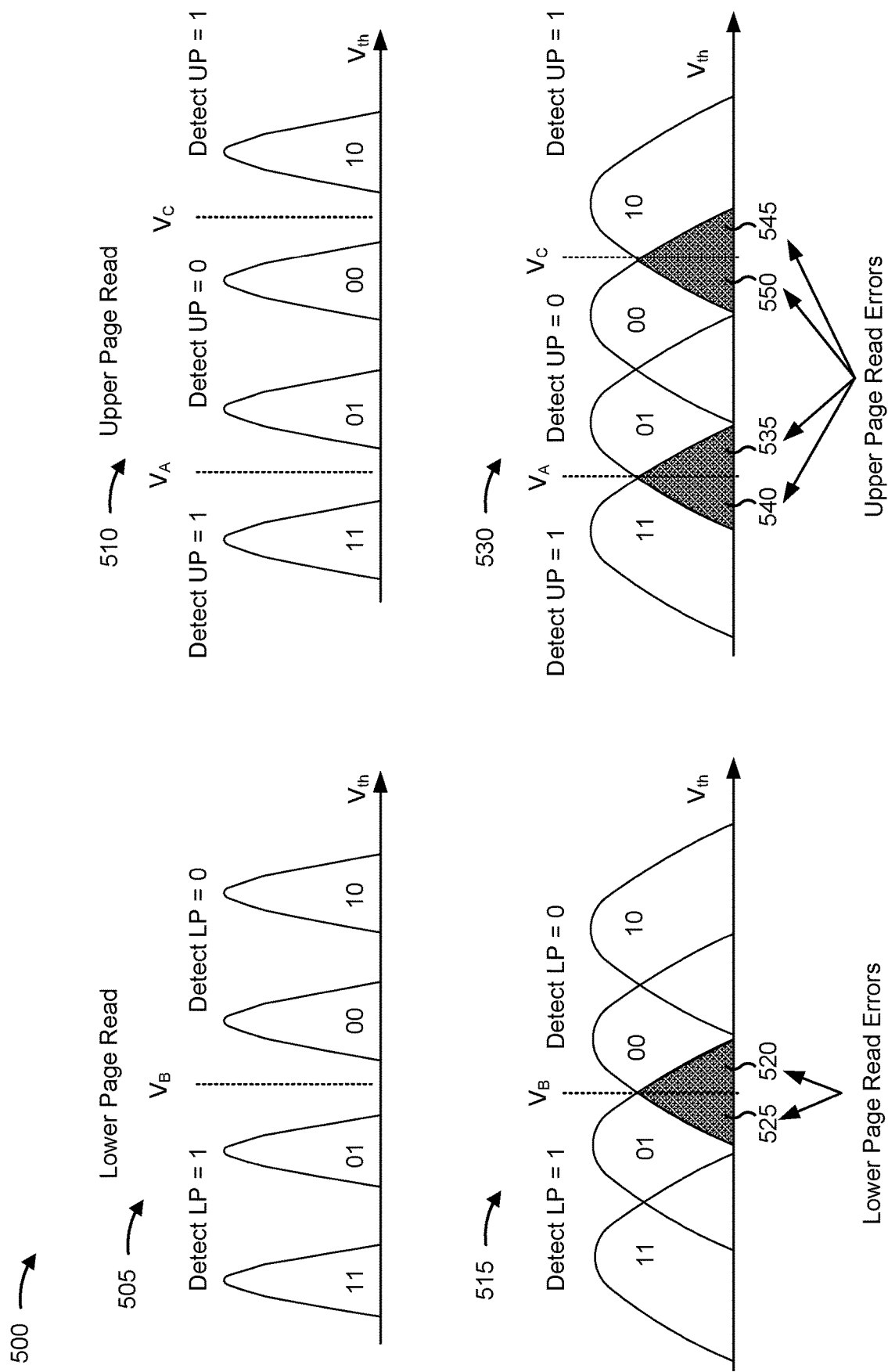
FIG. 5 is a diagram illustrating an example of read errors that may occur in an MLC non-volatile memory device.

FIG. 5 is a diagram illustrating an example 500 of read errors that may occur in an MLC non-volatile memory device. Although the read errors described in connection with FIG. 5 are described in the context of an MLC, the described concepts also apply to other types of memory cells, such as SLCs, TLCs, QLCs, and other types of memory cells.

To read the data stored in a memory cell, such as an SLC, an MLC, a TLC, a QLC, or another type of memory cell, a memory device (or a component thereof) may sense a voltage associated with the stored charge on the memory cell (e.g., may sense a Vth associated with the cell) and determine a corresponding binary number associated with that voltage. More particularly, to read the data of the MLC shown in FIG. 5, the memory device (or a component thereof) may apply a read reference voltage to the cell in an effort to induce current in the memory cell, and the memory device (or a component thereof) may determine a corresponding bit string associated with a voltage that induced (or else did not induce) current. Put another way, the memory device may apply various read reference voltages to sense the threshold voltage (Vth) associated with the data stored in the cell.

More particularly, for an MLC, the memory device may perform a lower page (also shown as LP) read and an upper page (also shown as UP) read. As shown by reference number 505, for a lower page read, the memory device may apply to a read reference voltage, shown as $V_B$. $V_B$ may represent a voltage between threshold voltage distributions associated with the first two states (e.g., threshold voltage distributions associated with binary 11 and 01) and threshold voltage distributions associated with the second two states (e.g., threshold voltage distributions associated with binary 00 and 10). If current flows when $V_B$ is applied to the memory cell, then the threshold voltage may be considered to be less than $V_B$, thus corresponding to one of binary 11 or binary 01 (meaning that the lower page data represents a "1"). If current does not flow when $V_B$ is applied to the memory cell, then the threshold voltage may be considered to be more than $V_B$, thus corresponding to one of binary 00 or binary 10 (meaning that the lower page data represents a "0").

As shown by reference number 510, an upper page read may be performed in a similar manner. More particularly, when the detected lower page data is a "1", a read reference voltage of $V_A$ may be applied to the memory cell to thereafter determine the upper page data. $V_A$ may represent a voltage between a threshold voltage distribution associated with the first state (e.g., a threshold voltage distribution associated with binary 11) and a threshold voltage distribution associated with the second state (e.g., a threshold voltage distribution associated with binary 01). If current flows when $V_A$ is applied to the memory cell, then the threshold voltage may be considered to be less than $V_A$, thus corresponding to binary 11 (meaning that the upper page data represents a "1"). If current does not flow when $V_A$ is applied to the memory cell, then the threshold voltage may be considered to be more than $V_A$ but less than $V_B$ (as determined during the lower page read), thus corresponding to binary 01 (meaning that the upper page data represents a "0").

Similarly, when the detected lower page data is a "0," a read reference voltage of $V_C$ may be applied to the memory cell to thereafter determine the upper page data. $V_C$ may represent a voltage between a threshold voltage distribution associated with the third state (e.g., a threshold voltage distribution associated with binary 00) and a threshold voltage distribution associated with the fourth state (e.g., a threshold voltage distribution associated with binary 10). If current flows when $V_C$ is applied to the memory cell, then the threshold voltage may be considered to be less than $V_C$ but more than $V_B$ (as determined during the lower page read), thus corresponding to binary 00 (meaning that the upper page data represents a "0"). If current does not flow when $V_C$ is applied to the memory cell, then the threshold voltage may be considered to be more than $V_C$, thus corresponding to binary 10 (meaning that the upper page data represents a "1").

Although not shown, read operations associated with TLCs, QLCs, and similar multi-bit cells may be performed in a similar manner, with additional read operations performed to detect the additional page data (e.g., the extra page data, top page data, or the like). For example, in a TLC, the memory device may first perform a lower page read, followed by an upper page read, and then followed by an extra page read. As described above, in some examples, an extra page read (also referred to as an XP read herein) may include performing read operations near a Level 3 threshold voltage (e.g., using a Level 3 read reference voltage, or Rd_lv3) as well as performing read operations near a Level 7 threshold voltage (e.g., using a Level 7 read reference voltage, or Rd_lv7).

In some cases, the threshold voltage distributions shown in FIG. 5 may be broadened and/or shifted due to noise, the back-pattern effect, cell-to-cell coupling, or similar phenomena, which may lead to read errors at the memory device. Noise in the memory cell may be caused by various sources, such as program-erase (P/E) cycling stress, charge leakage over time, read disturbances (e.g., disturbances caused by the application of a high voltage to a memory cell of a page not being read to deselect the cell while other cells on the page are being read), programming errors, cell-to-cell interference (such as unintentional electrical disturbance and/or interference of a memory cell when neighboring cells are read, written, or erased), or the like. As shown in FIG. 5, broadened and/or shifted voltage threshold distributions may lead to read errors, such as lower page read errors and/or upper page read errors.

First, as shown by reference number 515, a lower page read error may be caused by the broadening of voltage distributions that are near $V_B$ and/or that overlap with $V_B$. In the example shown in FIG. 5, the threshold voltage distributions associated with binary 01 and binary 00 have broadened to overlap with the read reference voltage $V_B$. This may result in a lower page read error because a cell programmed with binary 01 may act in a similar manner to a cell programmed with binary 00 (e.g., in response to an applied voltage). More particularly, if $V_B$ is applied to a memory cell that stores binary 01 but that is associated with a threshold voltage in the area labeled with reference number 520, no current would flow, erroneously indicating that the lower page data represents a "0" rather than a "1". On the other hand, if $V_B$ is applied to a memory cell that stores binary 00 but that is associated with a threshold voltage in the area labeled with reference number 525, current would flow, erroneously indicating that the lower page data represents a "1" rather than a "0".

Similarly, as shown by reference number 530, when performing an upper page read, an upper page read error may be caused by the broadening of voltage distributions that are near $V_A$ and/or $V_C$ and/or that overlap with $V_A$ and/or $V_C$. For example, memory cells storing binary 11 and associated with a threshold voltage in the area labeled by 535 may be erroneously read as storing upper page data of "0", memory cells storing binary 01 and associated with a threshold voltage in the area labeled by 540 may be erroneously read as storming upper page data of "1", memory cells storing binary 00 and associated with a threshold voltage in the area labeled by 545 may be erroneously read as storing upper page data of "1", and memory cells storing binary 10 and associated with a threshold voltage in the area labeled by 550 may be erroneously read as storing upper page data of "0". In some cases, and as described above, broadened and/or shifted threshold voltages near an XP read in a power loss error detection procedure may contribute to an FBC, even though such broadened and/or shifted threshold voltages may not be indicative that the LWP was not fully programmed and/or does not include a high enough reliability margin to be maintained.

In some cases, a memory device may attempt to adjust one or more read reference voltages in response to one or more of the read errors described above (e.g., in response to a cell storing one logical value or binary number being misread as storing a different logical value or binary number). In some instances, this may be referred to as a read retry or a read recovery process. In a read recovery process, one or more read reference voltages (such as $V_A$, $V_B$, or $V_C$ described in connection with the MLC) may be dynamically adjusted to track changes in threshold voltage distributions. More particularly, once a read process fails on a particular page of a memory, the memory device (and, more particularly, the controller and/or a read recovery component thereof) may attempt to recover the page using various read recovery steps, which use shifts in voltages from base read reference voltages. Put another way, the memory device may retry the read of a cell with an adjusted read reference voltage (e.g., by applying an offset to the read reference voltage) such that read errors are decreased or eliminated.

Returning to the example shown in FIG. 5, if a lower page error resulted in a cell storing binary 00 being read as binary 01, the read reference voltage ($V_B$) may be decreased (e.g., shifted to the left in the diagram shown by reference number 515) in an effort to eliminate the lower page read error. Conversely, if a lower page error resulted in a cell storing binary 01 being read as binary 00, the read reference voltage ($V_B$) may be increased (e.g., shifted to the right in the diagram shown by reference number 515). Similarly, the read reference voltages $V_A$ and $V_C$ may be shifted left or right (e.g., decreased or increased) in an effort to reduce or eliminate upper page read errors.

As described above, in some examples, read errors caused by broadening voltage threshold distributions and/or shifting voltage threshold distributions may result in inaccurate determinations in connection with a power loss error detection procedure (e.g., an NDPC procedure) or similar error detection process. More particularly, in examples involving TLCs, PB-induced threshold voltage shifting caused by a back-pattern effect, cell-to-cell coupling, or similar phenomena, may result in shifting threshold voltages, leading to a high FBC associated with an XP read operation. This may result in a high overkill rate for the power loss error detection procedure, such as an overkill rate of greater than 80% in some examples. In some examples, a single offset may be employed to reduce an overkill rate associated with a power loss error detection process. In such examples, the offset may be applied to read reference voltages associated with an XP read process associated with the power loss error detection procedure (e.g., an XP read process performed at a Level 3 read reference voltage, or Rd_lv3), which may result in a reduced overkill rate. However, because voltage shifts associated with the various threshold voltages may be more pronounced for lower PB fill ratios than for higher PB fill ratios, the single offset may still result in a relatively high overkill rate due to the WLG voltage shift variations. Accordingly, in some implementations, a WLG-dependent offset and/or a PB-fill-ratio dependent offset may be utilized for a power loss error detection procedure. In such implementations, a magnitude of an offset applied to a read reference voltage associated with an XP read process of the power loss error detection procedure, such as an offset applied to a Level 3 read reference voltage (e.g., Rd_lv3), may be dependent on a PB fill ratio (e.g., how much of the block has been written). Utilizing a WLG-dependent offset and/or a PB-fill-ratio dependent offset for a power loss error detection procedure may reduce overkill rates in some instances from over 80% to approximately 20%. Features associated with utilizing a WLG-dependent offset and/or a PB-fill-ratio dependent offset are described in more detail below in connection with FIGS. 6-9.

As indicated above, FIG. 5 is provided as an example. Other examples may differ from what is described with regard to FIG. 5.

Figure 6:
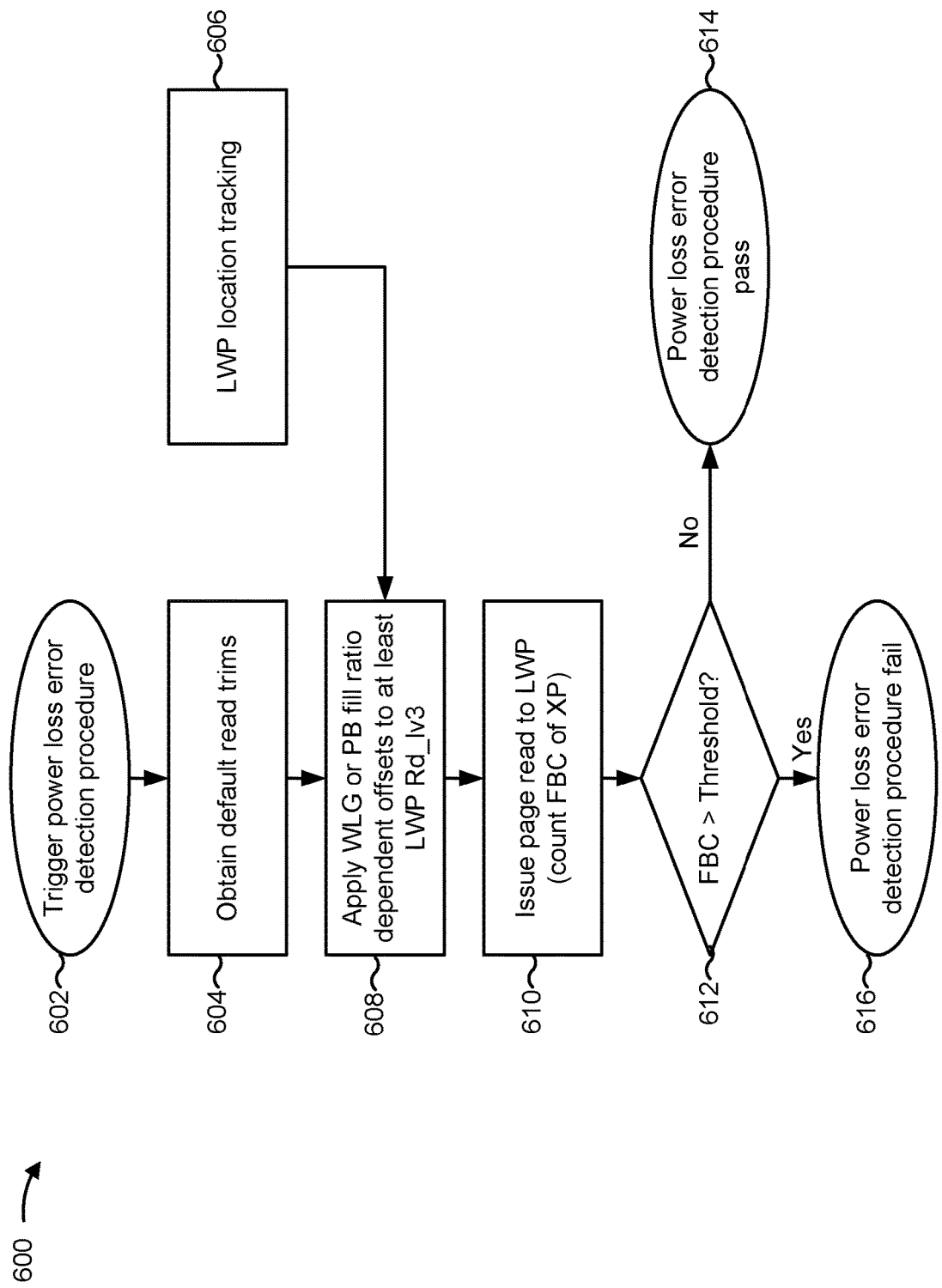
FIG. 6 is a diagram of an example of power loss error detection using PB handling.

FIG. 6 is a diagram of an example 600 of power loss error detection using PB handling. The operations described in connection with FIG. 6 may be performed by the memory device 120 and/or one or more components of the memory device 120, such as the controller 130 and/or one or more components of the controller 130.

As shown by reference number 602, the operations may begin by the memory device 120 triggering a power loss error detection procedure, such as an NDPC procedure or similar power loss error detection procedure. In some implementations, the power loss error detection component 235 of the memory device 120 may trigger the power loss error detection procedure. Additionally, or alternatively, in some implementations, the memory device 120 may trigger the power loss error detection procedure based on determining that a power loss has occurred. For example, the memory device 120 may trigger the power loss error detection procedure upon powering up of the memory device 120 following a power loss.

As shown by reference number 604, the memory device 120 may obtain default read trims, which may be read reference voltages associated with read operations of a power loss error detection procedure. For example, the memory device 120 may obtain default read trims associated with performing XP read operations of the power loss error detection procedure, among other read operations associated with the power loss error detection process. In some implementations, for TLC memory devices, the default read trims associated with performing XP read operations may be associated with a Level 3 read reference voltage (e.g., Rd_lv3) and/or a Level 7 read reference voltage (e.g., Rd_lv7). As described above in connection with FIG. 5, in some implementations, the default read trims may be associated with initially programmed threshold voltages and/or may be read reference voltages that do not otherwise take into account PB-induced threshold voltage shifts, such as voltage shifts associated with a back-pattern effect, cell-to-cell coupling, or a similar phenomenon. For example, the default read trims may be associated with initially programmed threshold voltages associated with an XP read procedure, such as a Rd_lv3 voltage and/or a Rd_lv7 voltage without any offset applied thereto. As described above, performing the power loss error detection procedure based only on these default reads without any adjustment may result in a high overkill rate and thus high power, computing, and memory resource consumption.

In that regard, the memory device may apply an WLG-dependent offset and/or a PB-fill-ratio-dependent offset to one of more of the default read trims associated with the power loss error detection procedure in order to reduce an overkill rate and thus reduce power, computing, and memory resource consumption. More particularly, as shown by reference number 606, the memory device 120 (e.g., the LWP location tracking component 230 of the memory device 120) may be configured to perform LWP tracking such that a location of an LWP may be used in connection with the power loss error detection procedure. For example, the memory device 120 may be configured to track a WL associated with an LWP, determine a WLG associated with the WL associated with the LWP, and/or determine a PB fill ratio associated with the WL associated with the LWP.

Accordingly, and as shown by reference number 608, the memory device 120 may apply at least one of a WLG-dependent offset or a PB-fill-ratio-dependent offset to the default read trims, such as to the Rd_lv3 associated with the LWP and/or to other default read trims. In some implementations, the memory device 120 may be configured to retrieve the at least one of the WLG-dependent offset or the PB-fill-ratio-dependent offset from a look up table. Details of determining a WLG associated with the LWP and/or implementing a WLG-dependent offset are described in more detail below in connection with FIG. 7, and details of determining a PB fill ratio associated with the LWP and/or implementing a PB-fill-ratio-dependent offset are described in more detail below in connection with FIG. 8.

As shown by reference number 610, the memory device 120 may be configured to issue a page read to the LWP and perform a power loss error detection procedure based on the LWP and the at least one of the WLG-dependent offset or the PB-fill-ratio-dependent offset. For example, the memory device 120 may be configured to detect an FBC at one or more trims associated with an XP read operation (e.g., the memory device 120 may be configured to count bit errors associated with Rd_lv3 and/or Rd_lv7), with at least one of the trims adjusted by the at least one of the WLG-dependent offset or the PB-fill-ratio-dependent offset. For example, in some implementations, a Level 3 read reference voltage (e.g., Rd_lv3) may be adjusted by at least one of the WLG-dependent offset or the PB-fill-ratio-dependent offset. In some other implementations, a Level 3 read reference voltage (e.g., Rd_lv3) and a Level 7 read reference voltage (e.g., Rd_lv7) are both adjusted by a corresponding WLG-dependent offset or the PB-fill-ratio-dependent offset.

As shown by reference number 612, upon completion of compiling the FBC, the memory device 120 may be configured to determine whether the FBC has exceeded a threshold. If the FBC has not exceeded the threshold, the memory device 120 may be configured to determine that the LWP passes the power loss error detection procedure, as shown by reference number 614. In such implementations, the memory device 120 may thus keep the LWP, because passing the power loss error detection procedure may be indicative that a programming operation was completed on the LWP or else that the LWP has a high enough reliability margin to be maintained. If the FBC exceeds the threshold, the memory device 120 may be configured to determine that the LWP fails the power loss error detection procedure, as shown by reference number 616. In such implementations, the memory device 120 may thus mark the LWP as invalid and/or may mark the LWP for erasure, because failing the power loss error detection procedure may be indicative that a programming operation was not completed on the LWP or else that the LWP has too low of a reliability margin to be maintained. In some implementations, by applying the at least one of the WLG-dependent offset or the PB-fill-ratio-dependent offset to the read trims (e.g., by applying the at least one of the WLG-dependent offset or the PB-fill-ratio-dependent offset to a Level 3 read reference voltage associated with an XP read of a power loss error detection procedure), an overkill rate may be reduced because the WLG-dependent offset or the PB-fill-ratio-dependent offset may compensate for threshold voltage shifts due to the back-pattern effect, cell-to-cell coupling, or similar phenomenon.

As indicated above, FIG. 6 is provided as an example. Other examples may differ from what is described with regard to FIG. 6.

Figure 7:
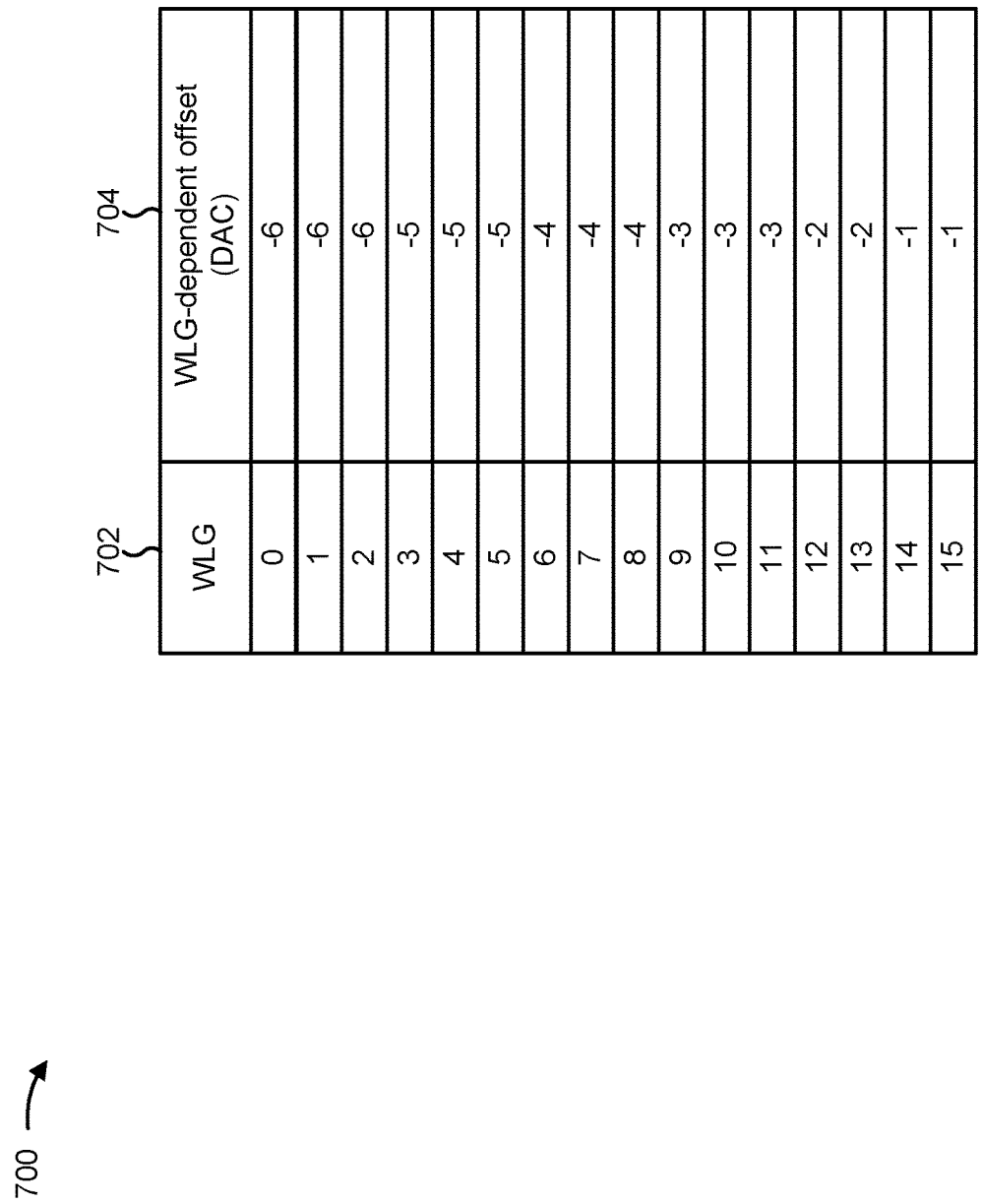
FIG. 7 is a diagram of an example table of world-line-group-dependent offsets associated with power loss error detection using PB handling.

FIG. 7 is a diagram of an example table 700 of WLG-dependent offsets associated with power loss error detection using PB handling. The example table 700 may be a look up table used by the memory device 120 (e.g., the controller 130 of the memory device 120, and, more particularly, the LWP location tracking component 230 and/or the power loss error detection component 235 of the memory device 120) to determine a WLG-dependent offset associated with a power loss error detection procedure.

In some implementations, the example table 700 may associate each of a number of WLGs, as listed in a WLG column 702, with a corresponding WLG-dependent offset, as listed in a WLG-dependent offset column 704. In some implementations, the WLG-dependent offsets may be offsets applied to a read trim associated with a power loss error detection procedure, such as an offset applied to a read trim associated with an XP read procedure associated with the power loss error detection procedure. More particularly, in some implementations, the WLG-dependent offsets may be offsets applied to a Level 3 read reference voltage (e.g., Rd_lv3) associated with an XP read procedure associated with the power loss error detection procedure. In some implementations, the WLG-dependent offsets may be provided in units associated with a resolution of a digital-to-analog converter (DAC) associated with the memory device 120. For example, in the implementation shown in FIG. 7, a DAC may be associated with a resolution of 40 millivolts (mV), and thus each WLG-dependent offset shown in FIG. 7 may be associated with a multiple of 40 mV. For example, an offset associated with WLG 0 may be equal to −6×40 mv (e.g., −240 mV), an offset associated with WLG 8 may be equal to −4×40 mv (−160 mV), an offset associated with WLG 15 may be associated with −1×40 mV (e.g., −40 mV), and so forth. In some other implementations, different DAC resolutions may be employed for finer granularity. For example, in some implementations, 1 DAC may be equivalent to 10 mV, and thus more granular WLG-dependent offsets may be employed.

Each WLG may be associated with a subset of WLs of a block. More particularly, a block may be associated with a total number of WLs (e.g., $WL_{max}$), and each WLG may be associated with a subset of the total number of WLs. For example, in the example depicted in FIG. 7, the block may be associated with 16 WLGs, indexed 0 through 15, and thus each WLG may be associated with approximately ¹⁄₁₆-th of the total WLs associated with the block. For example, the first ¹⁄₁₆-th of WLs (e.g., $WL_0$ through $WL_{max/16}$) may be associated with WLG 0, the second ¹⁄₁₆-th of WLs (e.g., $WL_{max/16}$ through $WL_{2*max/16}$) may be associated with WLG 1, and so forth. In some implementations, a block may be associated with more or fewer than sixteen WLGs.

Moreover, as described above in connection with FIG. 5, threshold voltages may be subject to PB-induced voltage shift phenomena, such as a back-shift effect, cell-to-cell coupling, or similar phenomena, which may be more prevalent at lower PB fill ratios. Put another way, PB-induced threshold voltage shifts may be inversely proportional to a PB fill ratio, such that the voltage shift is more prevalent at lower PB fill levels. Accordingly, in some implementations, higher WLG-dependent offsets may be utilized for a power loss error detection procedure when an LWP is associated with a lower PB fill ratio, resulting in more accurate power loss error detection and thus reduced overkill rates. For example, in the depicted example, a WLG-dependent offset of −6 DAC (e.g., −240 mV for a 40 mV DAC resolution) may be associated with WLGs 0, 1, and 2; a WLG-dependent offset of −5 DAC (e.g., −200 mV) may be associated with WLGs 3, 4, and 5; a WLG-dependent offset of −4 DAC (e.g., −160 mV) may be associated with WLGs 6, 7, and 8; a WLG-dependent offset of −3 DAC (e.g., −120 mV) may be associated with WLGs 9, 10, and 11; a WLG-dependent offset of −2 DAC (e.g., −80 mV) may be associated with WLGs 12, and 13; and a WLG-dependent offset of −1 DAC (e.g., −40 mV) may be associated with WLGs 14 and 15. For DACs including a finer resolution (e.g., 10 mV), a different WLG-dependent offset may be used for each WLG (e.g., WLG 0 may be associated with a different offset than WLG 1, which may be associated with a different offset than WLG 2, and so forth). In some implementations, utilizing WLG-dependent offsets, such as by adjusting a read level voltage associated with an XP read operation (e.g., a read operation associated with a Level 3 read reference voltage) by the WLG-dependent offsets shown in the example table 700, may reduce an overkill rate associated with the power loss error detection procedure from over 80% to approximately 20%.

As indicated above, FIG. 7 is provided as an example. Other examples may differ from what is described with regard to FIG. 7.

Figure 8:
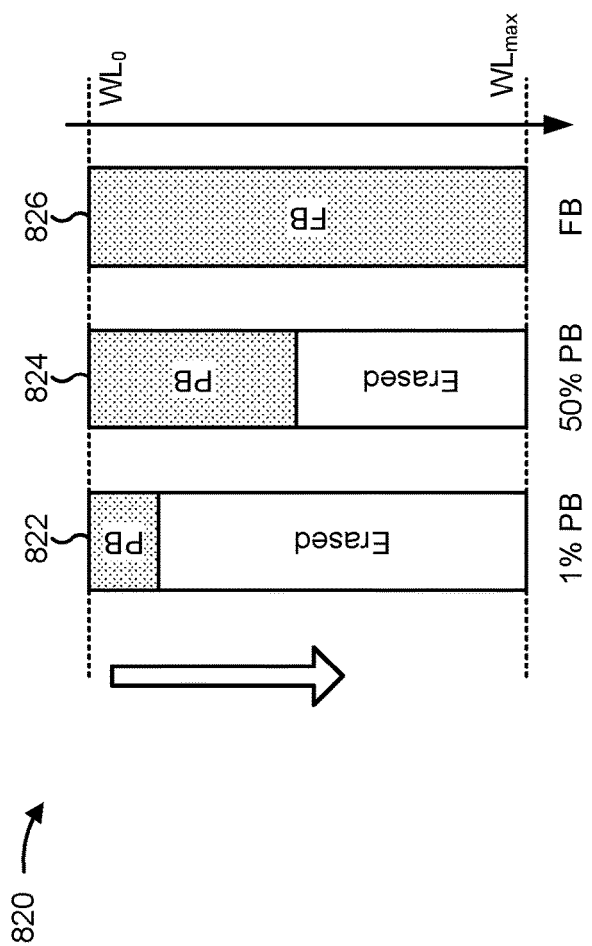
FIG. 8 is a diagram of an example table of PB-fill-ratio-dependent offsets associated with power loss error detection using PB handling.

FIG. 8 is a diagram of an example table 800 of PB-fill-ratio-dependent offsets associated with power loss error detection using PB handling. The example table 800 may be a look up table used by the memory device 120 (e.g., the controller 130 of the memory device 120, and, more particularly, the LWP location tracking component 230 and/or the power loss error detection component 235 of the memory device) to determine a PB-fill-ratio-dependent offset associated with a power loss error detection procedure. In some implementations, the example table 800 may be a table stored at the memory device 120 and used for a different purpose. For example, in some implementations, the example table 800 may be a PB boundary WL look up table, which may specify offsets to be used in connection with read processes when performing a read command on a boundary WL associated with a PB.

In some implementations, the example table 800 may associate ranges of PB fill percentages, as listed in a WLG column 802, with corresponding PB-fill-ratio-dependent offsets, as indicated by columns 804, 806, 808, 810, 812, 816, and 818. In some implementations, each column may list offsets associated with a corresponding read level. For example, the first column 804 may list offsets (shown as Ofstn-1) associated with a Level 1 read reference voltage (sometimes referred to as Rd_lv1), the second column 806 may list offsets (shown as Ofstn-2) associated with a Level 2 read reference voltage (sometimes referred to as Rd_lv2), the third column 808 may list offsets (shown as Ofstn-3) associated with a Level 3 read reference voltage (e.g., Rd_lv3), the fourth column 810 may list offsets (shown as Ofstn-4) associated with a Level 4 read reference voltage (sometimes referred to as Rd_lv4), the fifth column 812 may list offsets (shown as Ofstn-5) associated with a Level 5 read reference voltage (sometimes referred to as Rd_lv5), the sixth column 816 may list offsets (shown as Ofstn-6) associated with a Level 6 read reference voltage (sometimes referred to as Rd_lv6), and the seventh column 818 may list offsets (shown as Ofstn-7) associated with a Level 7 read reference voltage (e.g., Rd_lv7). In some implementations, the offsets listed in the first column 804 and the fifth column 812 may be associated with LP reads, the offsets listed in the second column 806, the fourth column 810, and the sixth column 816 may be associated with UP reads, and/or offsets listed in the third column 808 and the seventh column 818 may be associated with XP reads. In that regard, for power loss error detection procedures that are based on an FBC of an XP read, the offsets listed in the third column 808 and/or the seventh column 818 may be utilized when performing the power loss error detection procedure. That is, the offsets listed in the third column 808 may be applied to a Level 3 read reference voltage (e.g., Rd_lv3) associated with the XP read and/or the offsets listed in the seventh column 818 may be applied to a Level 7 read reference voltage (e.g., Rd_lv7) associated with the XP read.

More particularly, in a similar manner as described above in connection with the WLG-dependent offsets, the PB-fill-ratio-dependent offsets may be offsets applied to a read trim associated with a power loss error detection process, such as an offset applied to a read trim associated with an XP read procedure associated with the power loss error detection procedure. In some implementations, the PB-fill-ratio-dependent offsets may be offsets applied to a Level 3 read trim (e.g., Rd_lv3) associated with an XP read procedure associated with the power loss error detection procedure. More particularly, the offsets listed in the third column 808 (e.g., Ofstn-3) may be applied to a Level 3 read trim when performing the power loss error detection procedure. In some other implementations, additional offsets may be employed when employing the power loss error loss detection procedure. For example, in implementations in which an XP read procedure is associated with the power loss error detection procedure, and thus an FBC is determined using reads at both a Level 3 voltage (e.g., Rd_lv3) and a Level 7 voltage (e.g., Rd_lv7), the offsets listed in the third column 808 (e.g., Ofstn-3) may be applied to a Level 3 read trim when performing the power loss error detection procedure, and/or the offsets listed in the seventh column 818 (e.g., Ofstn-7) may be applied to a Level 7 read trim when performing the power loss error detection procedure.

Moreover, as described above in connection with FIGS. 5 and 6, threshold voltages may be subject to PB-induced voltage shift phenomena, such as back-shift effect, cell-to-cell coupling, which may be more prevalent at lower PB fill ratios (e.g., PB-induced threshold voltage shifts may be inversely proportional to a PB fill ratio). Accordingly, in some implementations, higher PB-fill-ratio-dependent offsets may be utilized for a power loss error detection procedure for lower PB fill ratios, resulting in more accurate power loss error detection and thus reduced overkill rates. More particularly, as shown by reference number 820, which indicates three example blocks 822, 824, and 826, a PB ratio may refer to a proportion of a block on which data has been written. That is, data may be written sequentially to WLs associated with a block, beginning at a first WL associated with a block (shown as $WL_0$ in the example shown in connection with reference number 820) to a last WL associated with a block (shown as $WL_{max}$ in the example shown in connection with reference number 820). In such examples, the PB fill ratio may be defined as a number of WLs of the block that include data written to them (e.g., a number of WLs which are not erased, shown as "PB" in the example blocks 822 and 824, and shown by "FB," standing for "full block," in the example indicated by reference number 826) divided by the total number of WLs in the block (e.g., $WL_{max}$). Thus, for a block having a PB fill ratio of 1% (shown as "1% PB" in FIG. 8), 1% of the WLs may contain data with the remaining 99% of the WLs being erased, as schematically shown by the example block 822. For a block having a PB fill ratio of 50% (shown as "50% PB" in FIG. 8), half of WLs may contain data with the remaining half of the WLs being erased, as schematically shown by the example block 824. And for a FB (e.g., a block having a PB fill ratio of 100%, shown as "FB" in FIG. 8), all of the associated WLs may contain data, as schematically shown by the example block 826.

In such implementations, each set of offsets may be associated with a range of PB fill ratios. For example, in the depicted example, a first set of PB-fill-ratio-dependent offsets (e.g., Ofst1-1 through Ofst1-7) may be used when a block is associated with a PB fill ratio in a range of 0% to approximately 10%. A second set of PB-fill-ratio-dependent offsets (e.g., Ofst2-1 through Ofst2-7) may be used when a block is associated with a PB fill ratio in a range of approximately 10% to approximately 20%. A third set of PB-fill-ratio-dependent offsets (e.g., Ofst3-1 through Ofst3-7) may be used when a block is associated with a PB fill ratio in a range of approximately 20% to approximately 30%. A fourth set of PB-fill-ratio-dependent offsets (e.g., Ofst4-1 through Ofst4-7) may be used when a block is associated with a PB fill ratio in a range of approximately 30% to approximately 50%. And a fifth set of PB-fill-ratio-dependent offsets (e.g., Ofst5-1 through Ofst5-7) may be used when a block is associated with a PB fill ratio in a range of approximately 50% to approximately 100%. In some other implementations, different PB-fill-ratio ranges may be associated with a set of offsets without departing from the scope of the disclosure. In some implementations, utilizing PB-fill-ratio-dependent offsets, such as by adjusting a read reference voltage associated with an XP read operation (e.g., a Rd_lv3 operation) by one of the PB-fill-dependent offsets shown in the example table 800 (e.g., the Ofstn-3 for corresponding to the PB fill ratio), may reduce an overkill rate associated with the power loss error detection procedure from over 80% to approximately 20%.

As indicated above, FIG. 8 is provided as an example. Other examples may differ from what is described with regard to FIG. 8.

Figure 9:
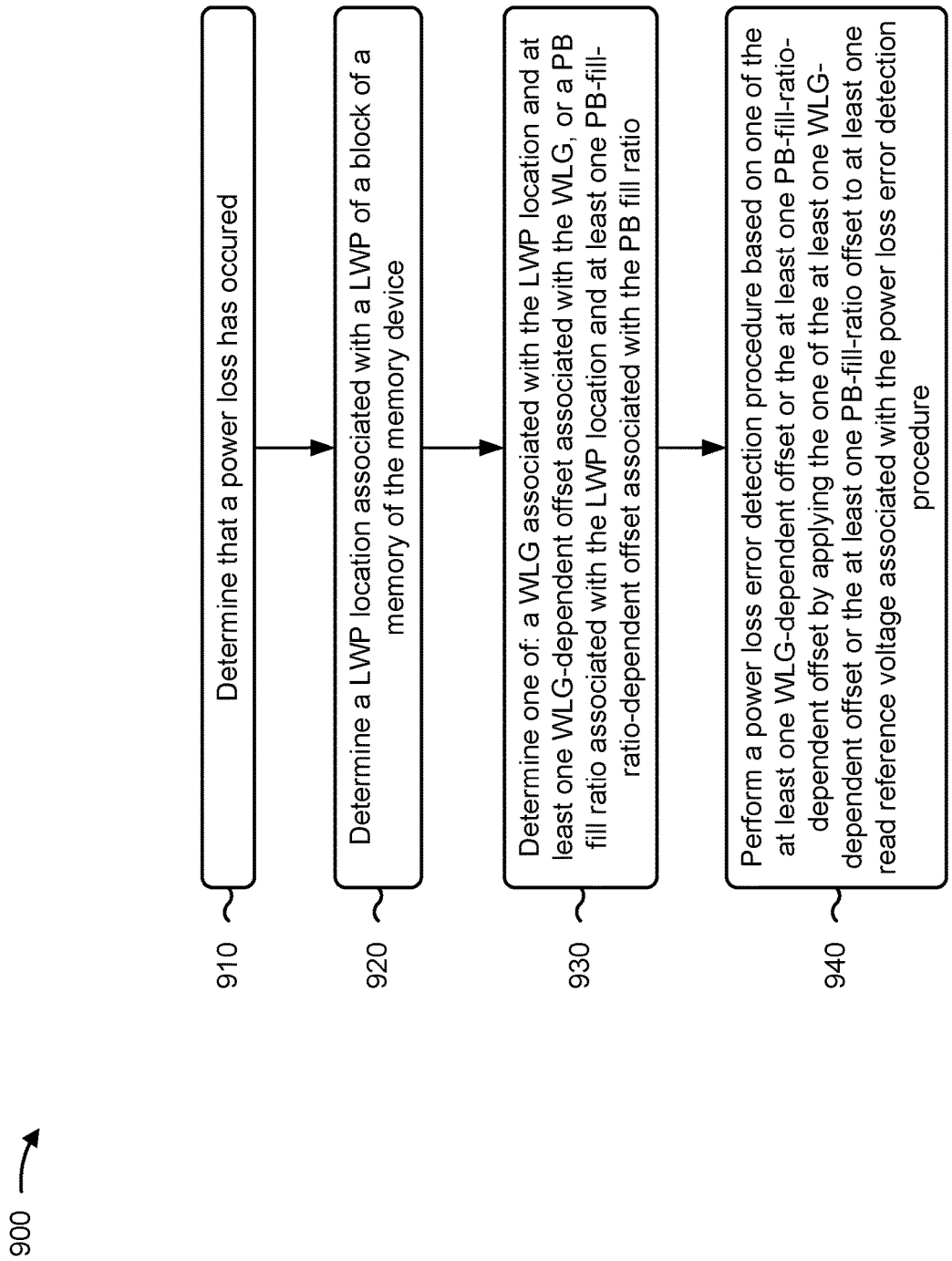
FIG. 9 is a flowchart of an example method associated with power loss error detection using PB handling.

FIG. 9 is a flowchart of an example method 900 associated with power loss error detection using PB handling. In some implementations, a controller of the memory device (e.g., the controller 130 of the memory device 120) may perform or may be configured to perform the method 900. In some implementations, another device or a group of devices separate from or including the controller of the memory device (e.g., the system 100) may perform or may be configured to perform the method 900. Additionally, or alternatively, one or more components of the controller of the memory device (e.g., the controller 130, the memory management component 225, the LWP location tracking component 230, and/or the power loss error detection component 235) may perform or may be configured to perform the method 900. Thus, means for performing the method 900 may include the controller of the memory device and/or one or more components of the controller of the memory device. Additionally, or alternatively, a non-transitory computer-readable medium may store one or more instructions that, when executed by the controller of the memory device (e.g., the controller 130 of the controller of the memory device 120), cause the controller of the memory device to perform the method 900.

As shown in FIG. 9, the method 900 may include determining that a power loss has occurred (block 910). As further shown in FIG. 9, the method 900 may include determining an LWP location associated with an LWP of a block of a memory of the memory device (block 920). As further shown in FIG. 9, the method 900 may include determining one of: a WLG associated with the LWP location and at least one WLG-dependent offset associated with the WLG, or a PB fill ratio associated with the LWP location and at least one PB-fill-ratio-dependent offset associated with the PB fill ratio (block 930). As further shown in FIG. 9, the method 900 may include performing a power loss error detection procedure based on one of the at least one WLG-dependent offset or the at least one PB-fill-ratio offset by applying the one of the at least one WLG-dependent offset or the at least one PB-fill-ratio offset to at least one read reference voltage associated with the power loss error detection procedure (block 940).

The method 900 may include additional aspects, such as any single aspect or any combination of aspects described below and/or described in connection with one or more other methods or operations described elsewhere herein.

In a first aspect, the method 900 includes determining, by the controller of the memory device, the WLG associated with the LWP location and the at least one WLG-dependent offset associated with the WLG, and performing, by the controller of the memory device, the power loss error detection procedure based at least in part on the at least one WLG-dependent offset.

In a second aspect, alone or in combination with the first aspect, the method 900 includes determining, by the controller of the memory device, the PB fill ratio associated with the LWP location and the at least one PB-fill-ratio-dependent offset associated with the PB fill ratio, and performing, by the controller of the memory device, the power loss error detection procedure based on the at least one PB-fill-ratio-dependent offset.

In a third aspect, alone or in combination with one or more of the first and second aspects, the power loss error detection procedure is associated with a NAND detect program completion procedure.

In a fourth aspect, alone or in combination with one or more of the first through third aspects, the power loss error detection procedure is based on a fail bit count associated with extra page data.

In a fifth aspect, alone or in combination with one or more of the first through fourth aspects, the one of the at least one WLG-dependent offset or the at least one PB-fill-ratio-dependent offset includes at least an offset associated with a Level 3 read reference voltage.

In a sixth aspect, alone or in combination with one or more of the first through fifth aspects, the method 900 includes determining, by the controller of the memory device, the one of the at least one WLG-dependent offset or the at least one PB-fill-ratio-dependent offset by using a look up table.

In a seventh aspect, alone or in combination with one or more of the first through sixth aspects, the one of the at least one WLG-dependent offset or the at least one PB-fill-ratio-dependent offset includes an offset in a range of approximately −40 mV to approximately −240 mV.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

Figure 10:
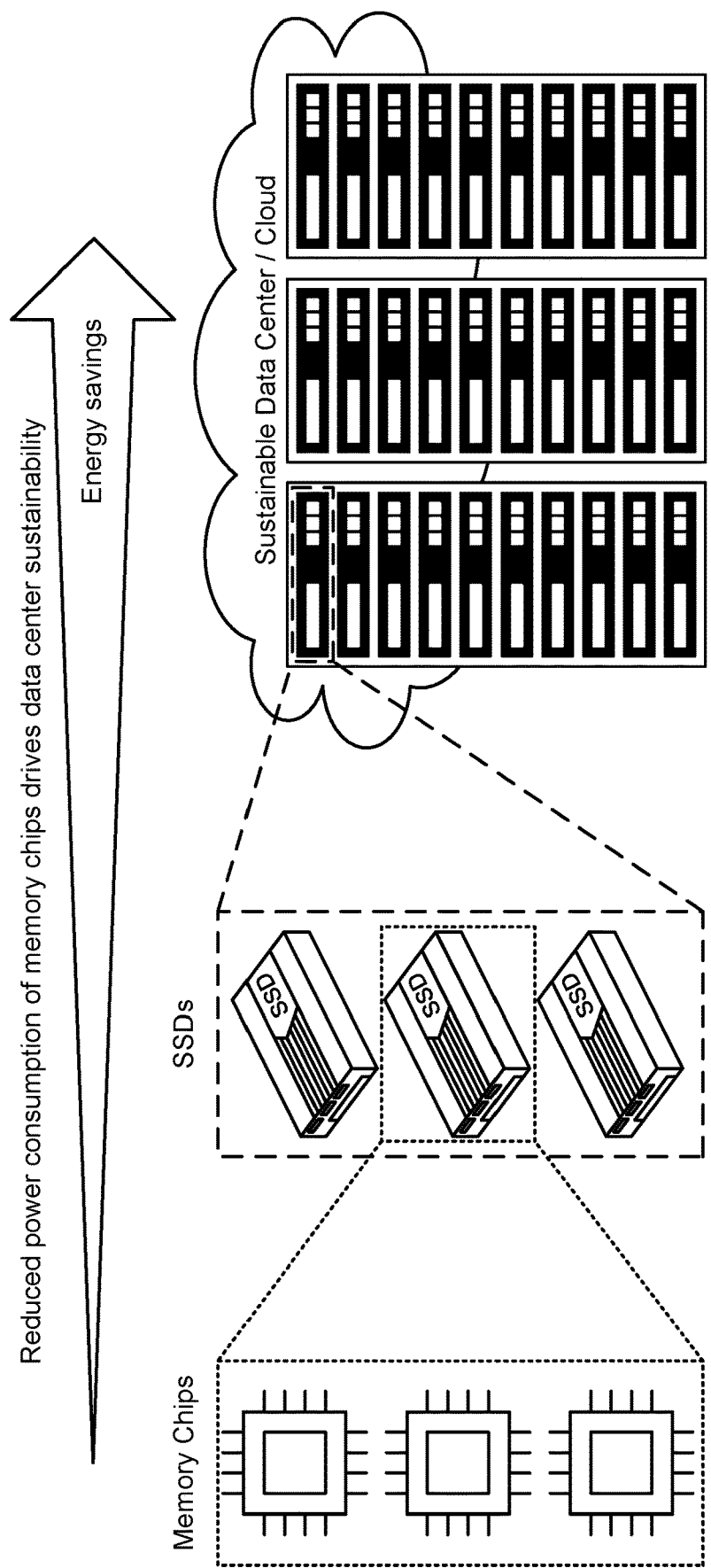
FIG. 10 is a diagram illustrating example systems in which the memory device described herein may be used.

FIG. 10 is a diagram illustrating example systems in which the memory device 120 described herein may be used. In some implementations, one or more memory devices 120 may be included in a memory chip. Multiple memory chips may be packaged together and included in a higher level system, such as an SSD or another type of memory drive. Each SSD may include, for example, up to five memory chips, up to ten memory chips, or more. A data center or cloud computing environment may include multiple SSDs to store a large amount of data. For example, a data center may include hundreds, thousands, or more SSDs.

As described above, some implementations described herein reduce power consumption of a memory device 120. As shown in FIG. 10, this reduced power consumption drives data center sustainability and leads to energy savings because of the large volume of memory devices 120 included in a data center.

As indicated above, FIG. 10 is provided as an example. Other examples may differ from what is described with regard to FIG. 10.

In some implementations, a memory device includes one or more components configured to: determine that a power loss has occurred; determine an LWP location associated with an LWP of a block of a memory of the memory device; determine one of: a WLG associated with the LWP location and at least one WLG-dependent offset associated with the WLG, or a PB fill ratio associated with the LWP location and at least one PB-fill-ratio-dependent offset associated with the PB fill ratio; and perform a power loss error detection procedure based on one of the at least one WLG-dependent offset or the at least one PB-fill-ratio-dependent offset by applying the one of the at least one WLG-dependent offset or the at least one PB-fill-ratio offset to at least one read reference voltage associated with the power loss error detection procedure.

In some implementations, a method includes determining, by a controller of a memory device, that a power loss has occurred; determining, by the controller of the memory device, an LWP location associated with an LWP of a block of a memory of the memory device; determining, by the controller of the memory device, one of: a WLG associated with the LWP location and at least one WLG-dependent offset associated with the WLG, or a PB fill ratio associated with the LWP location and at least one PB-fill-ratio-dependent offset associated with the PB fill ratio; and performing, by the controller of the memory device, a power loss error detection procedure based on one of the at least one WLG-dependent offset or the at least one PB-fill-ratio offset by applying the one of the at least one WLG-dependent offset or the at least one PB-fill-ratio offset to at least one read reference voltage associated with the power loss error detection procedure.

In some implementations, an apparatus includes means for determining that a power loss has occurred; means for determining an LWP location associated with an LWP of a block of a memory associated with the apparatus; means for determining one of: a WLG associated with the LWP location and at least one WLG-dependent offset associated with the WLG, or a PB fill ratio associated with the LWP location and at least one PB-fill-ratio-dependent offset associated with the PB fill ratio; and means for performing a power loss error detection procedure based on one of the at least one WLG-dependent offset or the at least one PB-fill-ratio-dependent offset by applying the one of the at least one WLG-dependent offset or the at least one PB-fill-ratio offset to at least one read reference voltage associated with the power loss error detection procedure.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the term "approximately" means "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      determine that a power loss has occurred;
      determine a last written page (LWP) location associated with an LWP of a block of a memory of the memory device;
      determine one of:
         a word line group (WLG) associated with the LWP location and at least one WLG-dependent offset associated with the WLG, or
         a partial block (PB) fill ratio associated with the LWP location and at least one PB-fill-ratio-dependent offset associated with the PB fill ratio; and
      perform a power loss error detection procedure based on one of the at least one WLG-dependent offset or the at least one PB-fill-ratio-dependent offset by applying the one of the at least one WLG-dependent offset or the at least one PB-fill-ratio offset to at least one read reference voltage associated with the power loss error detection procedure.

2. The memory device of claim 1, wherein the one or more components are further configured to:
determine the WLG associated with the LWP location and the at least one WLG-dependent offset associated with the WLG; and
perform the power loss error detection procedure based on the at least one WLG-dependent offset.

3. The memory device of claim 1, wherein the one or more components are further configured to:
determine the PB fill ratio associated with the LWP location and the at least one PB-fill-ratio-dependent offset associated with the PB fill ratio; and
perform the power loss error detection procedure based on the at least one PB-fill-ratio-dependent offset.

4. The memory device of claim 1, wherein the power loss error detection procedure is associated with a NAND detect program completion procedure.

5. The memory device of claim 1, wherein the power loss error detection procedure is based on a fail bit count associated with extra page data.

6. The memory device of claim 1, wherein the one of the at least one WLG-dependent offset or the at least one PB-fill-ratio-dependent offset includes at least an offset associated with a Level 3 read reference voltage.

7. The memory device of claim 1, wherein the one or more components are further configured to determine the one of the at least one WLG-dependent offset or the at least one PB-fill-ratio-dependent offset by using a look up table.

8. The memory device of claim 1, wherein the one of the at least one WLG-dependent offset or the at least one PB-fill-ratio-dependent offset includes an offset in a range of approximately −40 millivolts (mV) to approximately −240 mV.

9. A method, comprising:
determining, by a controller of a memory device, that a power loss has occurred;
determining, by the controller of the memory device, a last written page (LWP) location associated with an LWP of a block of a memory of the memory device;
determining, by the controller of the memory device, one of:
a word line group (WLG) associated with the LWP location and at least one WLG-dependent offset associated with the WLG, or
a partial block (PB) fill ratio associated with the LWP location and at least one PB-fill-ratio-dependent offset associated with the PB fill ratio; and
performing, by the controller of the memory device, a power loss error detection procedure based on one of the at least one WLG-dependent offset or the at least one PB-fill-ratio offset by applying the one of the at least one WLG-dependent offset or the at least one PB-fill-ratio offset to at least one read reference voltage associated with the power loss error detection procedure.

10. The method of claim 9, further comprising:
determining, by the controller of the memory device, the WLG associated with the LWP location and the at least one WLG-dependent offset associated with the WLG; and
performing, by the controller of the memory device, the power loss error detection procedure based at least in part on the at least one WLG-dependent offset.

11. The method of claim 9, further comprising:
determining, by the controller of the memory device, the PB fill ratio associated with the LWP location and the at least one PB-fill-ratio-dependent offset associated with the PB fill ratio; and
performing, by the controller of the memory device, the power loss error detection procedure based on the at least one PB-fill-ratio-dependent offset.

12. The method of claim 9, wherein the power loss error detection procedure is associated with a NAND detect program completion procedure.

13. The method of claim 9, wherein the power loss error detection procedure is based on a fail bit count associated with extra page data.

14. The method of claim 9, wherein the one of the at least one WLG-dependent offset or the at least one PB-fill-ratio-dependent offset includes at least an offset associated with a Level 3 read reference voltage.

15. The method of claim 9, further comprising determining, by the controller of the memory device, the one of the at least one WLG-dependent offset or the at least one PB-fill-ratio-dependent offset by using a look up table.

16. The method of claim 9, wherein the one of the at least one WLG-dependent offset or the at least one PB-fill-ratio-dependent offset includes an offset in a range of approximately −40 millivolts (mV) to approximately −240 mV.

17. An apparatus, comprising:
means for determining that a power loss has occurred;
means for determining a last written page (LWP) location associated with an LWP of a block of a memory associated with the apparatus;
means for determining one of:
a word line group (WLG) associated with the LWP location and at least one WLG-dependent offset associated with the WLG, or
a partial block (PB) fill ratio associated with the LWP location and at least one PB-fill-ratio-dependent offset associated with the PB fill ratio; and
means for performing a power loss error detection procedure based on one of the at least one WLG-dependent offset or the at least one PB-fill-ratio-dependent offset by applying the one of the at least one WLG-dependent offset or the at least one PB-fill-ratio offset to at least one read reference voltage associated with the power loss error detection procedure.

18. The apparatus of claim 17, further comprising:
means for determining the WLG associated with the LWP location and the at least one WLG-dependent offset associated with the WLG; and
means for performing the power loss error detection procedure based at least in part on the at least one WLG-dependent offset.

19. The apparatus of claim 17, further comprising:
means for determining the PB fill ratio associated with the LWP location and the at least one PB-fill-ratio-dependent offset associated with the PB fill ratio; and
means for performing the power loss error detection procedure based on the at least one PB-fill-ratio-dependent offset.

20. The apparatus of claim 17, wherein the power loss error detection procedure is associated with a NAND detect program completion procedure.

* * * * *